Oct. 14, 1924.                                                              1,511,879
              L. S. GELSER ET AL
            PLASTIC PIPE JARRING MACHINE
            Filed June 29, 1922        2 Sheets-Sheet 1

Inventors
L. S. Gelser
H. A. Gelser
Attorney

Oct. 14, 1924.                                    1,511,879
L. S. GELSER ET AL
PLASTIC PIPE JARRING MACHINE
Filed June 29, 1922        2 Sheets-Sheet 2

Inventors
L. S. Gelser
H. N. Gelser
By
Attorney

Patented Oct. 14, 1924.

1,511,879

UNITED STATES PATENT OFFICE.

LORENZO S. GELSER AND HOVEY A. GELSER, OF FILLMORE, NEW YORK.

PLASTIC-PIPE JARRING MACHINE.

Application filed June 29, 1922. Serial No. 571,722.

*To all whom it may concern:*

Be it known that we, LORENZO S. GELSER and HOVEY A. GELSER, citizens of the United States, residing at Fillmore, in the county of Allegany, State of New York, have invented a new and useful Plastic-Pipe Jarring Machine; and we do hereby declare the following to be a full, clear, and exact description of the invention, such as will enable others skilled in the art to which it appertains to make and use the same.

The invention relates to jarring machines particularly adapted for use in the manufacture of concrete pipe and has for its object to provide a device of this character comprising a concrete mold carrying platform, which platform is guidable and movable in a horizontal plane and actuated by a plurality of cams cooperating with rollers carried by the platform in such a manner that the platform is forced upwardly and then allowed to drop by gravity onto bed members. The jarring action incident to the dropping of the platform onto the bed members forming means whereby plastic material within a mold will be jarred into a compact mass, for instance where the pipes are being formed with bells.

A further object is to mount the cams on transversely disposed shafts and to simultaneously rotate the transversely disposed shafts from a single drive shaft having sprocket and chain connections with the transversely disposed shaft.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1:
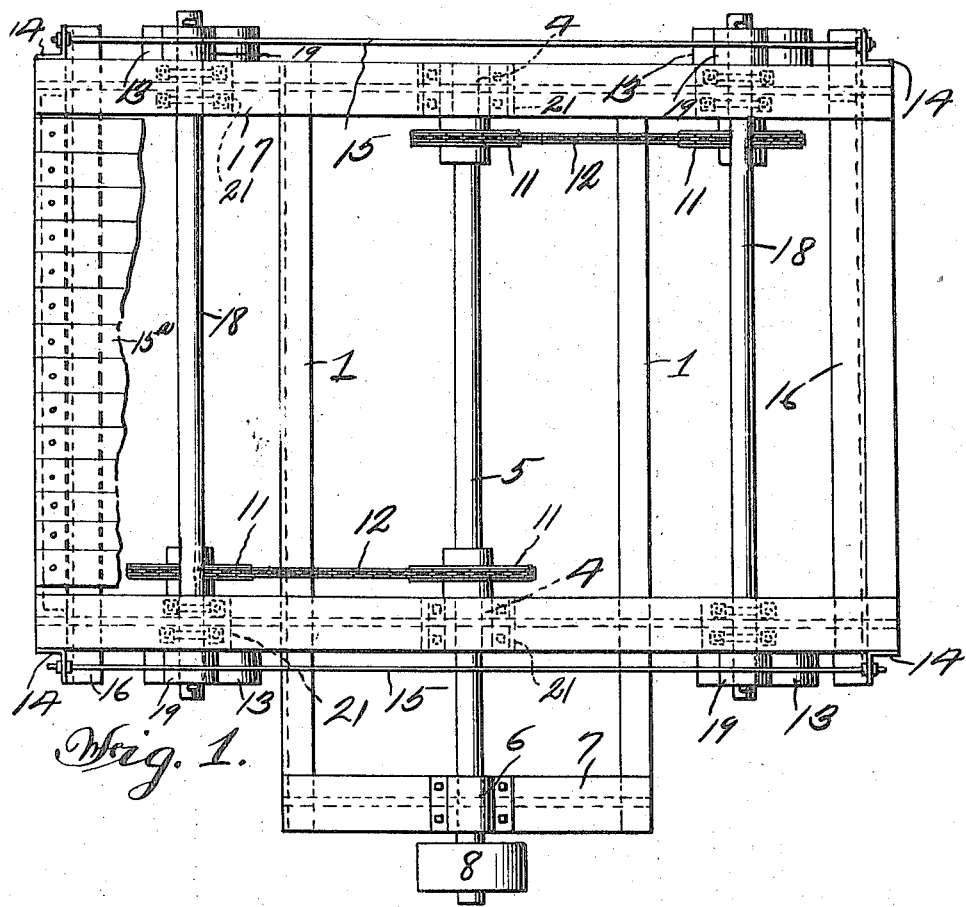
Figure 1 is a top plan view of the machine, part of the platform boards being broken away to better show the structure.
Figure 2:
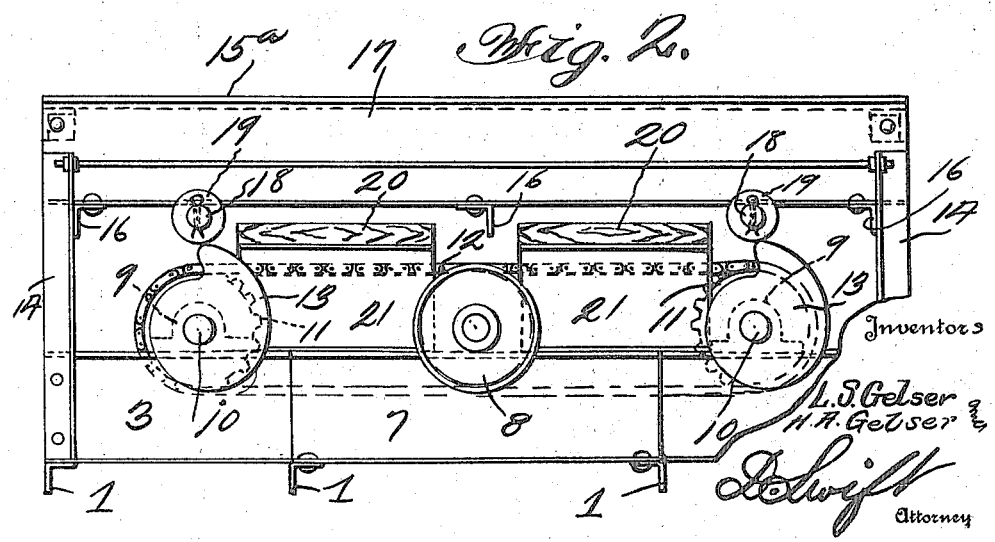
Figure 2 is a side elevation of the machine.
Figure 3:
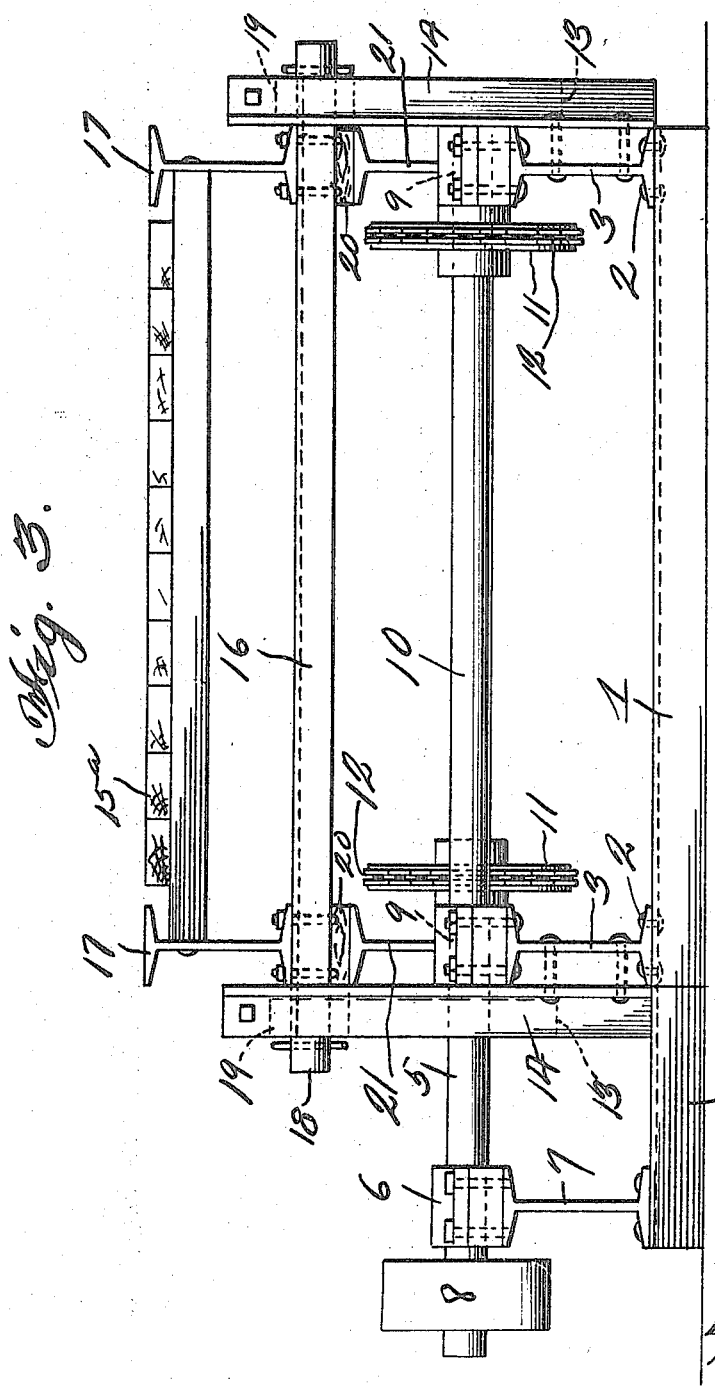
Figure 3 is an end elevation of the machine.

Referring to the drawings, the numeral 1 designates spaced parallel angle members to which is secured in parallel relation to each other at 2, longitudinally disposed I-beams 3, which I-beams in connection with the angle bars 1 form the base of the machine. Rotatably mounted in the bearings 4 carried by the upper sides of the I-beams 3 is a drive shaft 5, which shaft has its outer end rotatably mounted in a bearing 6 carried by an I beam 7 and is provided with a drive pulley 8 by means of which drive pulley the drive shaft 5 may be rotated from any suitable source of power. Rotatably mounted in bearings 9 carried by the upper sides of the beams 3 are parallel cam shafts 10, which cam shafts are simultaneously rotated by the drive shaft 5 through the medium of the sprockets 11 and sprocket chains 12, therefore, it will be seen that when the drive shaft 5 is rotated that the cam shafts 10 will simultaneously rotate thereby rotating the spiral cams 13. Extending upwardly at the corners of the base are guides 14 which are tied together by tie rods 15. Slidably mounted within the guides 14 is a mold receiving platform 15ª, which platform is carried by the transversely disposed bars 16 which engage the inner sides of the guides 14 and guide the platform in its upward and downward movement during a jarring operation. The platform 15ª is provided with longitudinally disposed I-beams 17 to the under sides of which are secured shafts 18, said shafts having their outer ends provided with rollers 19 with which the cams 13 engage during their rotation in such a manner that the platform 15ª is intermittently raised and dropped into engagement with members 20 preferably formed of wood and which are carried by the bed members 21 mounted on the upper sides of the I-beams 3. It will be seen that when molds are disposed on the platform 15ª with concrete therein and the cams 13 are rotated that the platform will be dropped onto the wooden members 20 and that the sudden stop caused thereby will jar the material within the mold and insure compactness of the material, or the forcing of material into angular shaped portions of the mold, such for instance as when the pipes are being formed with bells.

From the above it will be seen that a jarring machine is provided wherein concrete pipes and the like may be formed in a compact form and that the material will be jarred into all parts of the mold which is practically essential where pipes are being formed with bells. It will also be seen that tamping devices are obviated. It will also be seen that cams 13 when rotated will move the platform 15ª upwardly in a horizontal plane and that when the platform 15ª drops it will drop in a horizontal plane. It will also be seen that by varying the sizes of the wooden members 20 the distance of fall of the platform may be varied.

The invention having been set forth what is claimed as new and useful is:—

A jarring machine comprising a frame, a vertically movable platform slidably movable in said frame, a centrally disposed drive shaft disposed beneath said platform and rotatably mounted in bearings carried by the frame, parallel cam shafts located at opposite sides of the drive shaft, sprocket and chain connections between the drive shaft and the cam shafts, spiral cams carried by the ends of the cam shafts, rollers carried by the platform and engaging the cams, said cams forming means whereby when rotated the platform will be moved upwardly in a horizontal plane and allowed to fall in a horizontal plane and bed spaced members disposed beneath the platform at opposite sides thereof and between which the drive shaft is mounted and forming means for stopping the platform in its downward movement and imparting a jarring action, said spaced members comprising brackets at opposite sides of the frame and horizontally disposed wooden members carried by the upper sides of the brackets.

In testimony whereof we have signed our names to this specification in the presence of two subscribing witnesses.

LORENZO S. GELSER.
HOVEY A. GELSER.

Witnesses:
CLIFFORD B. JONES,
LENARETT ARMISAW.